E. SCHNEIDER.
RECORDER FOR FLUID PRESSURE PRESSES.
APPLICATION FILED MAR. 31, 1919.

1,352,150.

Patented Sept. 7, 1920.
2 SHEETS—SHEET 1.

Fig.1.

E. SCHNEIDER.
RECORDER FOR FLUID PRESSURE PRESSES.
APPLICATION FILED MAR. 31, 1919.

1,352,150.

Patented Sept. 7, 1920.
7 SHEETS—SHEET 2.

E. SCHNEIDER.
RECORDER FOR FLUID PRESSURE PRESSES.
APPLICATION FILED MAR. 31, 1919.

1,352,150.

Patented Sept. 7, 1920.
7 SHEETS—SHEET 5.

E. SCHNEIDER.
RECORDER FOR FLUID PRESSURE PRESSES.
APPLICATION FILED MAR. 31, 1919.

1,352,150.

Patented Sept. 7, 1920.
7 SHEETS—SHEET 7.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

RECORDER FOR FLUID-PRESSURE PRESSES.

1,352,150.     Specification of Letters Patent.     Patented Sept. 7, 1920.

Application filed March 31, 1919. Serial No. 286,492.

*To all whom it may concern:*

Be it known that I, EUGÈNE SCHNEIDER, citizen of the French Republic, and resident of 42 Rue d'Anjou, Paris, France, have invented a new and useful Recorder for Fluid-Pressure Presses, which invention is fully set forth in the following specification.

This invention has for its object to provide an improved apparatus for recording the factors of work done by the moving member of a mechanism. The improved apparatus is in particular applicable for recording pressures and times as functions of the stroke of the ram in hydraulic presses.

This particular application of the invention is illustrated in detail in the accompanying drawings in which:—

Figure 1:
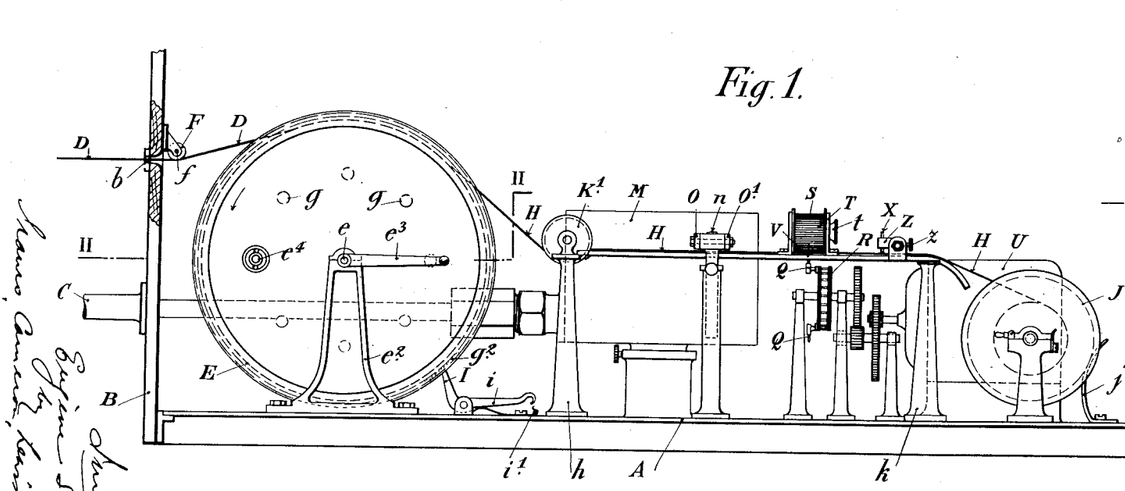
Figure 1 is a longitudinal side elevation of the entire apparatus.
Figure 2:
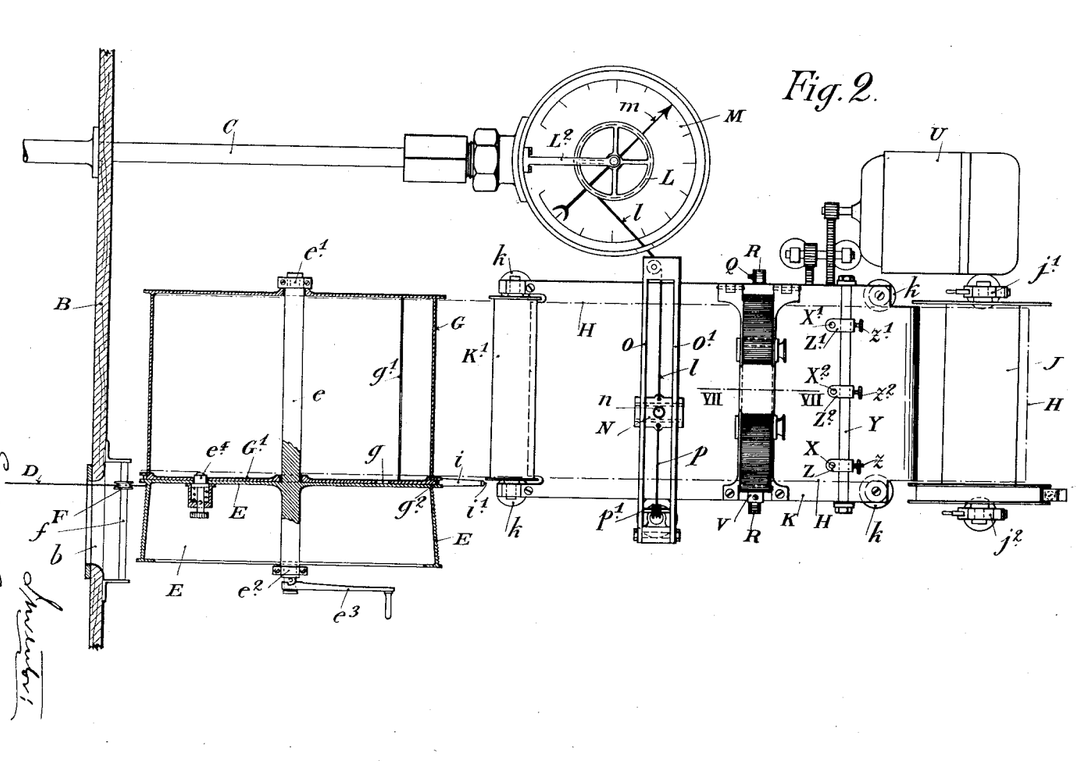
Fig. 2 is a horizontal section on the line II—II of Fig. 1.
Figure 3:
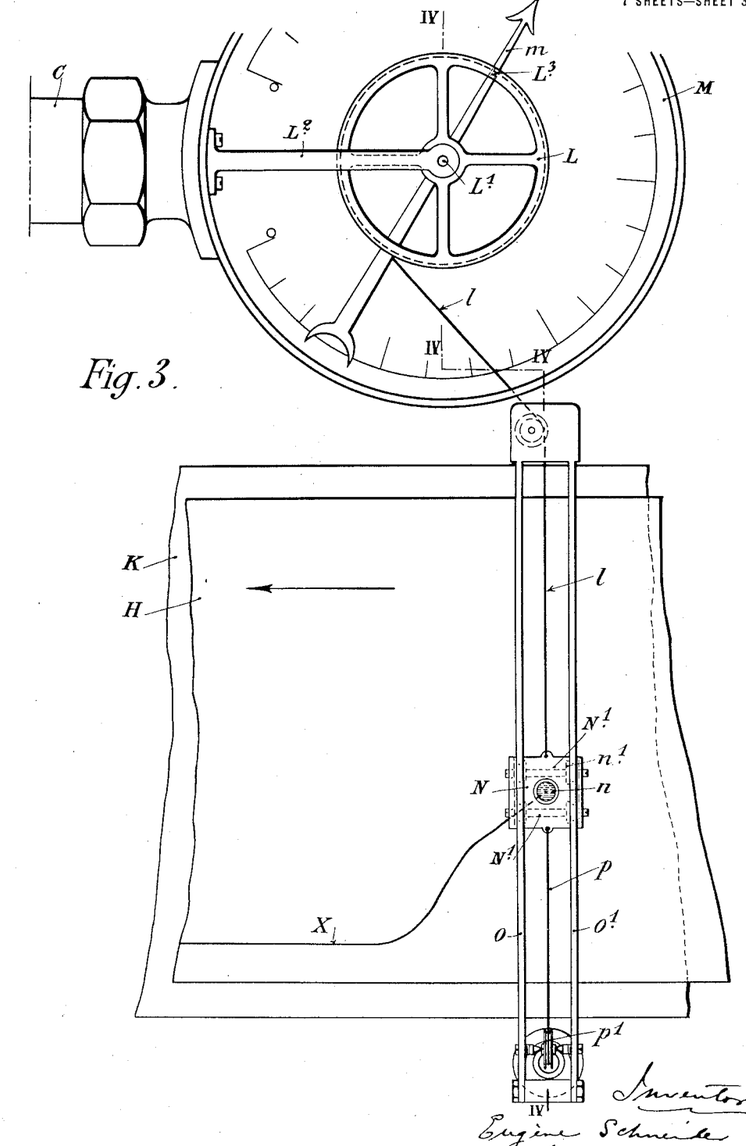
Fig. 3 is a partial plan drawn to a larger scale of the device for recording the pressures ("pressure recorder").
Figure 4:
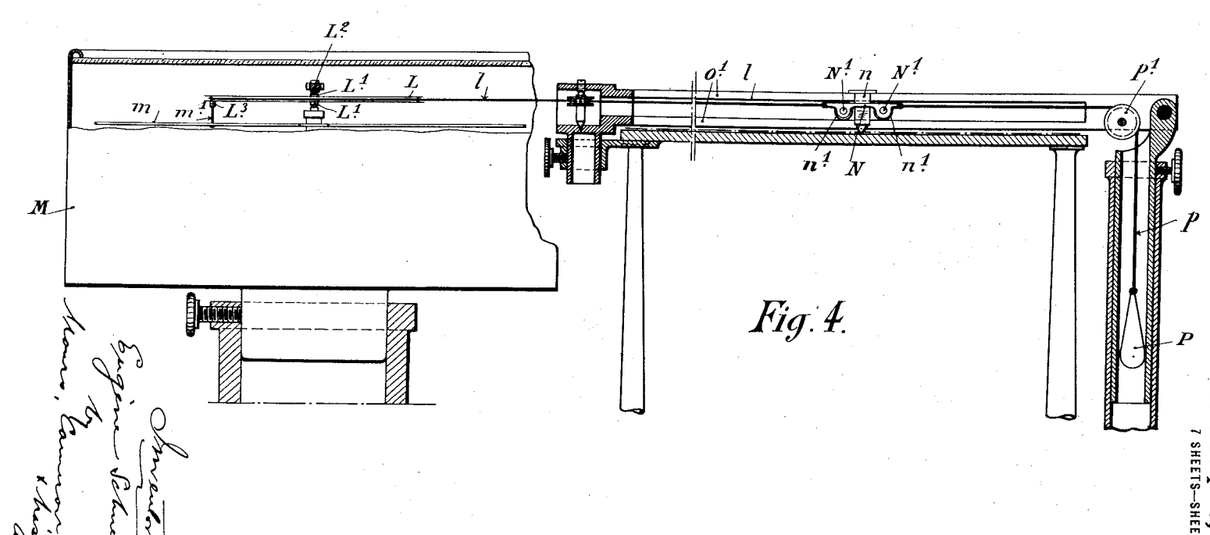
Fig. 4 is a section on the line IV—IV of Fig. 3.
Figure 5:
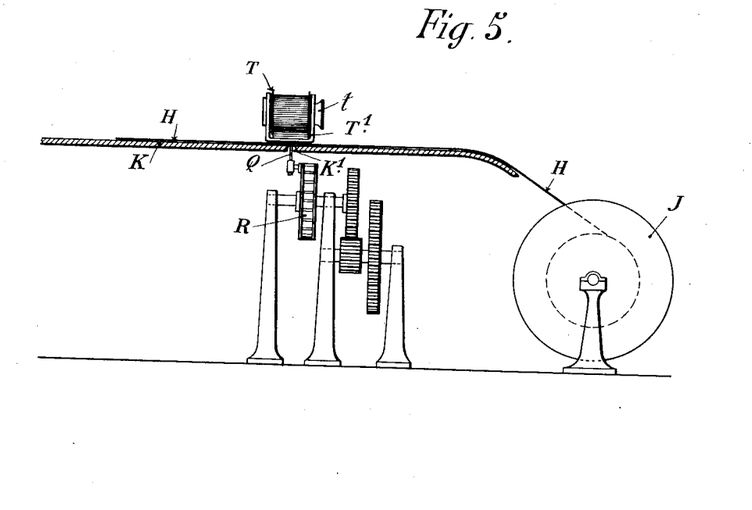
Fig. 5 is a detail elevation partly in vertical section of the device for recording the times ("time recorder").
Figure 6:
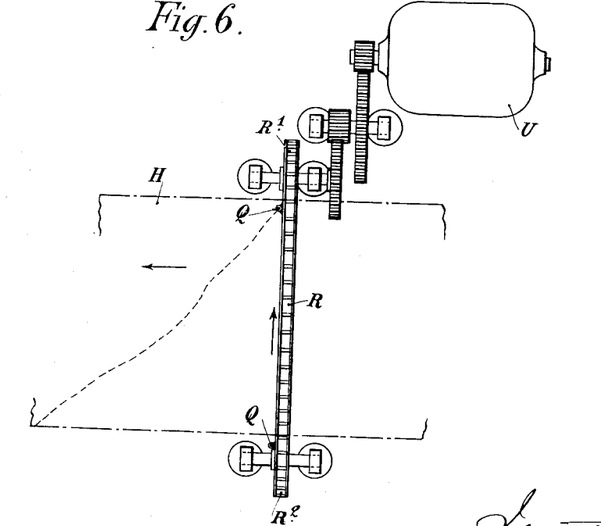
Fig. 6 is a corresponding plan.

The several elements and parts of the improved apparatus may be so grouped as to be carried by a frame A contained in a box B of which one cross wall is shown in Figs. 1 and 2. The whole box may be connected by means of a suitable connector provided by the pipe C of a pressure gage, to the liquid pressure pipe of the press. An aperture $b$ is provided in the wall B for the passage of a flexible wire cord D to which the motion of the press ram is imparted and which in its turn transmits the said motion to the recording devices.

The cord D is wound on a pulley E whose rim is inclined to its axis and is screw-threaded with a pitch that is slightly greater than the diameter of the cord. The rim is screw-threaded for the purpose of rendering the winding regular and preventing any crossing of the coils of the cord. A small tensioning pulley F mounted on a pin $f$ supported in brackets fixed to the wall B, serves to guide the cord D. The particular purpose of the inclination of the rim of the pulley E is hereinafter described.

The pulley E is fixed on an axle $e$ rotating with very slight friction in two bearings $e^1$, $e^2$. A small hand crank $e^3$ arranged to drive when rotated in the right hand direction, serves to rotate the axle $e$ and the pulley E carried by the latter, in such a manner as to wind up the cord D quickly at a desired instant. The cord must be rewound for each compressing action of the ram that is to be measured.

The axle $e$ also carries a very light drum G on which the paper strip H for receiving the diagrams is wound. This drum G may be loose on the axle $e$ and be fixed to the pulley at the desired instant by means of a clutch. This clutch consists of a spring bolt $e^4$ which is engaged, for the purpose of closing the clutch, in one of the holes $g$ in the end of the drum, and can be released at the desired instant. When released, the bolt $e^4$ bears against the end $G^1$ of the drum and enters the first one of the holes $g$ that it meets. Connection between the press and the drum can thus be established very quickly and strongly by the operator at the desired instant.

The paper strip H is attached to the drum in a very simple manner. A narrow slit $g^1$ is provided for this purpose in the wall of the drum; and it is merely necessary to introduce the end of the paper strip into this slit and to turn down the said end on the outside in order to get a driving hold on the paper strip.

The end $G^1$ of the drum is formed on its periphery with very fine teeth $g^2$ with which a pawl I works. This pawl has the sole purpose of keeping the drum in engagement when it is desired to wind the cord D on the pulley E. In order to release the drum from the pawl it is merely necessary to press upon the tail $i$ of the latter so as to engage it with a spring $i^1$ that will keep it away from the teeth $g^2$.

According as the cord D unwinds from the rim of the pulley, the paper strip H will be wound on the drum and the diameter of the wound strip will become greater. Consequently in order that the movements of the paper strip shall be strictly the same as those of the press ram, it is necessary that the diameter of the wound cord shall be at all times equal to the diameter of the wound paper strip. This is achieved by the use of an inclined rim for the pulley.

The inclination must of course be made to correspond with the determined thickness of the paper strip that is used.

The paper strip is wound off a reel J the journals of which are mounted in two bearings $j^1$, $j^2$ having removable caps. The reel is adapted to be slightly braked by means of a spring $j$.

The paper strip H slips over a table K supported on four pillars $k$; it passes under an absorbent tensioning device $K^1$ mounted on pivots.

The pressure in the press cylinder at each stroke of the ram is recorded by the following means:—

A pressure gage M is provided near the table K over which the paper strip travels. This pressure gage is connected to the press cylinder by the pipe C and it is converted into a recorder by the addition of a pulley L fixed to the gage pointer $m$ which is connected in its turn by a thread $l$ to a small carriage N carrying a recording pen $n$.

The pulley L is extremely light and is mounted on two pivots $L^1$ carried by a horizontal bracket $L^2$. The pressure gage pointer $m$ is provided with a stem $m^1$ that drives the pulley L by means of a block $L^3$ formed below the latter in such a manner as to maintain a constant connection between the said pointer and the pulley. The extremely flexible thread $l$ made for instance of silk, is adapted to be wound on the pulley L and is connected to the carriage N. The latter is very light and is mounted on two antifriction axles $N^1$ fitted with rollers $n^1$ rolling along between two pairs of rails O, $O^1$, arranged across the table on which the records are made. Through the floor of the carriage there passes loosely a small cylindrical ink container $n$ pierced with a very fine hole. This container acts as a pen.

The carriage N is drawn by the thread $l$ when the gage pointer $m$ indicates a rise in pressure. When the pressure drops, the carriage is moved backward by a counterweight P suspended from the free end of a thread $p$ which is connected to the said carriage and passes around a small pulley $p^1$ mounted on pivots.

The entire mechanism is very light-running, and as the pen is loose in the carriage it will follow readily the inequalities in the paper strip without causing a greater strain upon the carriage.

Since the paper strip moves in the direction of the arrow and with the motion of the press ram, each point of the pressure curve X will correspond to a strictly determined position of the ram. This curve indicates accurately the pressures as a function of the strokes of the ram by means of the straight ordinates of the curve X whose abscissæ represent the said strokes.

In addition to the pressure recorder the improved apparatus comprises a device for recording the volumes "swept" by the ram plunger as a function of the time consumed in the sweeping of the said volumes, or inversely, a device for recording the time periods taken by the ram to make the several strokes during the working of the press.

Figure 8:
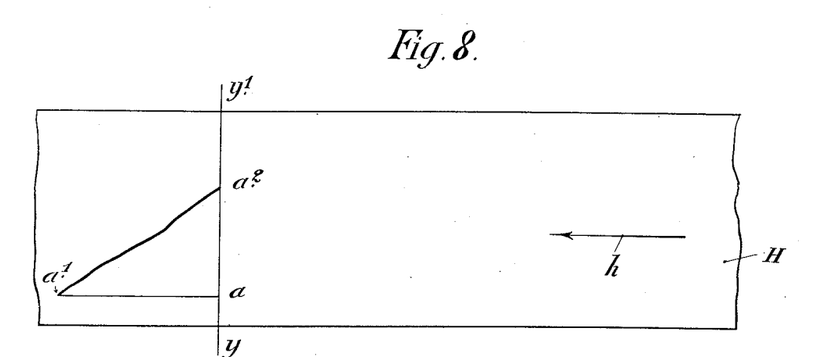
Figs. 8 and 9 are diagrams for explaining the principle of the method of recording the times.

Fig. 8 is a partial plan view of the paper strip which is assumed to be traveling in the direction of the arrow $h$. Assuming that a pencil or other drawing device starting from a fixed point $a$ is moving continuously at a constant speed across the paper strip along a path $y$—$y^1$ in contact with the paper strip and that the paper strip is connected to the ram so as to make the same movements as the latter, at right angles to the line $y$—$y^1$, then when the paper strip has traveled through a distance $a$—$a^1$ the pencil in moving from $a$ to $a^2$ will have drawn a line such as is indicated by $a^1$—$a^2$. If V represents in millimeters the constant speed of translation of the drawing device, the distance $a$—$a^2$ read along the axis $y$—$y^1$ will represent the length of time taken by the paper strip to travel the distance $a$—$a^1$.

This length of time will be equal to $\frac{a-a^2}{V}$.

If for instance V=100 m. m. per second, and if $a$—$a^2$=33 m. m., then the length of time that is read off the recorder will be $\frac{33}{100}$ seconds.

To assure that the improved apparatus shall furnish a strictly exact curve of volumes or paths swept by the press ram, it is merely necessary that the drawing pencil shall have a uniform motion.

For convenience in reading and measuring, it is advisable that the curve $a^1$—$a^2$ shall have an inclination of about 45 degrees. In such a case however, in order to make a record of a long stroke, it would be necessary to employ a very wide paper strip for the purpose of recording the periods of time. This drawback is remedied according to the present invention in the following manner:—

Figure 7:
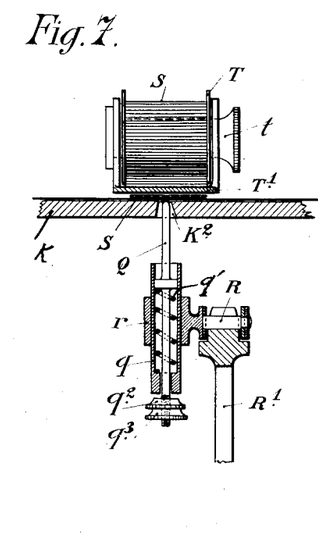
Fig. 7 is a detail elevation drawn to a larger scale partly in vertical section on the line VII—VII of Fig. 2.

The table K over which the paper strip H travels, is slit throughout its entire width at $K^2$—$K^2$, that is to say, at right angles to the direction of travel of the paper strip. Drawing pencils Q extend into this slit. Each of these pencils is constituted, as shown in Fig. 7, by a brass rod Q slidable in a socket $q$ fixed in a part $r$ formed in one piece with a side plate of a link of an endless chain R. The rod Q is pushed upward by a spring $q^1$. A nut $q^2$ and a lock-nut $q^3$ serve for adjusting the amount of projection of the rod Q. The recording pencil in acting upon the paper strip, presses the latter up against an inked canvas strip S. The action of the pencil upon the paper is facilitated by a flexible plate V that serves to prevent the edge of the paper strip from being torn.

The inked canvas strip is arranged on two reels T mounted on axle pins $t$ carried by a support T' hinged at one end to the table K. The underside of the said support affords a rigid surface against which the canvas strip bears so that the pencil shall not burst through the paper strip.

In its movement at a constant speed in the direction of the arrow the pencil Q will draw the curve of volumes on the paper strip. To enable the endless chain R to travel at a constant speed, it is coiled on two pinions $R^1$ and $R^2$, and its upper stretch can be supported by two slideways so as to prevent the pencil from oscillating in the direction of its motion. The pinion $R^1$ is driven by a small electric motor U fed from a storage battery and having its speed reduced by a train of toothed wheels.

Figure 9:
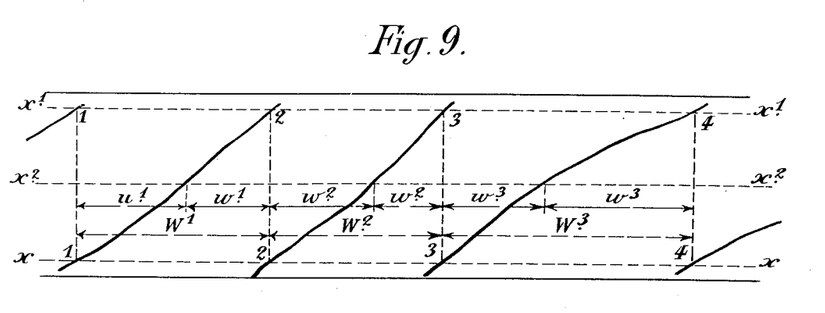

The endless chain R passes over the entire width of the table and it carries a plurality of recording pencils; four in the example shown. The distance between the consecutive pencils is such that when one of these is about to leave the paper, the following pencil takes its place ready to come into operation. The resulting diagram consists of a series of curves as shown in Fig. 9.

In this figure, the two parallel straight lines $x$—$x$ and $x^1$—$x^1$ are situated apart at the same distance as that which separates two consecutive pencils. The consecutive curves are intersected at points 1, 2, 3, 4 by straight lines at right angles to the said parallel lines. The curve of volumes is thereby divided into sections 1—2, 2—3, 3—4, etc., which thus allows of drawing a total curve of very great length in a very small space.

Pencils X—$X^1$ (Figs. 1 and 2) drawing on the paper strip parallel lines such as $x$—$x$, $x^1$—$x^1$ (Fig. 9) may be carried by socket Z adapted to be fixed by screws $z$ $z^1$ at varying points of a rod Y attached to the table K at right angles to the center line of the paper strip.

Assuming for instance that the motor imparts to the chain R that carries the pencils Q, a speed of 110 m. m. per second, then the pencils X and $X^1$ will be arranged 110 m. m. apart. The straight lines $x$—$x$, $x^1$—$x^1$ drawn by the pencils X and $X^1$ will form a graphic representation of the scale of time periods. Thus the volumes $W^1$, $W^2$, $W^3$, will be swept by the movable part of the press in 1 second.

If a third pencil $X^2$ is arranged halfway between the pencils X and $X^1$, it will draw on the paper strip a straight line $x^2$—$x^2$. Each of the volumes $w^1$, $w^2$, $w^3$ will be swept in ½ second.

The improved apparatus is applicable to any forging press or other press, and it allows of measuring the operative conditions of each stroke of the press, by supplying thereby exact data for the study of the various problems of forging, piercing, wire-drawing, mold-shaping and other analogous operations.

The cord D, instead of being connected to the moving part of a press, may be connected to the moving part of any other mechanism whose working it is desired to record. In some applications the pressure gage M may be replaced by an amperemeter or a voltmeter.

What I claim is:—

1. In an apparatus for recording work done by a fluid-pressure machine, the combination of a record-strip, a cylindrical drum for winding up the record-strip to impart travel to said record-strip, a conical pulley with its smaller end of a diameter the same as the diameter of the drum, means for connecting the pulley with the drum so that the rotation of the former will be imparted to the latter, a cord wound on the conical periphery of the pulley to be drawn from the latter to rotate the same to rotate the drum to wind the record-strip on said drum, said cord feeding off the pulley progressively from the smaller end of the pulley toward its larger end, the conicity of the pulley compensating for the increasing diameter of the drum as the record-strip is wound on said drum so that the travel of the record-strip and of the cord will remain the same, a pencil movable across the record-strip at right angles to the travel of the latter, and a device actuated by the fluid-pressure of the machine for moving the pencil.

2. An improved apparatus for drawing automatically a curve whose coördinates correspond respectively to the movements of a press ram and to the time periods during which the said movements take place, said improved apparatus comprising an endless belt driven at a constant speed over suitable guides by the action of a motor across a paper strip which is to receive the record, the said belt carrying a series of pencils or styluses spaced apart in such a manner that one pencil will come under the said strip near one edge of the latter at the instant when the preceding pencil has left the opposite edge, the said pencils projecting through a slit of the table over which the paper strip travels, and pressing the paper strip against an inked web, and means actuated by the movement of the press-ram for moving the paper-strip across the table.

3. An apparatus as claimed in claim 2, comprising the arrangement on a rod supported across and above the paper strip at right angles to the direction of travel of the latter, of pencils capable of being fixed at varying intervals of distance apart and adapted to draw parallel lines that form the scale for reading off the time periods.

4. In an apparatus for recording work done by a fluid-pressure machine, the combination of a table, a record-strip movable over said table, means for propelling the record-strip over the table, a track extending across the table at right angle to the travel of the record-strip, a carriage on said track carrying a pencil in contact with the record-strip, a weight connected with the carriage to pull it normally in one direction, a device having a rotatable member turned by the variations in the fluid-pressure in the machine, a pulley on said rotatable member to be turned with the same, and a thread on the pulley and connected with the carriage so that the winding or unwinding of the thread on the pulley will move the carriage to vary the position of the pencil on the record-strip.

In testimony whereof I have signed this specification.

EUGÈNE SCHNEIDER.